United States Patent
Nakamura et al.

[11] Patent Number: 6,004,420
[45] Date of Patent: Dec. 21, 1999

[54] METHOD OF PRODUCING OPTICAL DISKS AND APPARATUS USED THEREFOR

[75] Inventors: Masao Nakamura; Toshihiko Tomita; Hitoshi Matsuoka, all of Osaka, Japan

[73] Assignee: Nitto Denko Corporation, Osaka, Japan

[21] Appl. No.: 09/008,067

[22] Filed: Jan. 16, 1998

[30] Foreign Application Priority Data

Jan. 21, 1997 [JP] Japan .................................. 9-008248

[51] Int. Cl.⁶ .............................. B32B 31/04; G11B 7/26
[52] U.S. Cl. ...................... 156/249; 156/286; 156/306.6; 156/541; 156/542; 156/556; 156/581; 369/286
[58] Field of Search ..................... 156/247, 249, 156/306.6, 541, 542, 581, 556, 286; 369/13, 281, 286

[56] References Cited

U.S. PATENT DOCUMENTS

| | | |
|---|---|---|
| 4,939,011 | 7/1990 | Takahashi et al. . |
| 4,990,208 | 2/1991 | Kano . |
| 5,146,438 | 9/1992 | Harper ................................ 369/286 X |
| 5,284,538 | 2/1994 | Suzuki et al. . |
| 5,318,653 | 6/1994 | Toide et al. . |
| 5,938,891 | 8/1999 | Kashiwagi et al. . |

FOREIGN PATENT DOCUMENTS

| | | |
|---|---|---|
| 0 443 797 | 8/1991 | European Pat. Off. . |
| 2-152043 | 6/1990 | Japan . |
| 2-208841 | 8/1990 | Japan . |
| 3-189939 | 8/1991 | Japan . |
| 4-370547 | 12/1992 | Japan . |

OTHER PUBLICATIONS

Patent Abstracts of Japan vol. 016, No. 012 (P–1297), Jan. 13, 1992 & JP 03 230338 A (Japan Steel Works Ltd: The) Oct. 14, 1991, *Abstract.

Patent Abstracts of Japan vol. 014, No. 508 (P–1128), Nov. 7, 1990 & JP 02 210630 A (Japan Steel Works Ltd: The) Aug. 22, 1990 *Abstract.

Patent Abstracts of Japan vol. 010, No. 254 (P–492), Aug. 30, 1986, & JP 61 080534 A (Toshiba Corp) Apr. 24, 1986 *Abstract.

Patent Abstracts of Japan vol. 013, No. 543 (P–970), Dec. 6, 1989 & JP 01 224942 A (Fuji Electric Co Ltd), Sep. 7, 1989 *Abstract.

Patent Abstracts of Japan, vol. 011, No. 230 (P–599), Jul. 28, 1987 & JP 62 042347 A (Sanyo Electric Co., Ltd.), Feb. 24, 1987, *Abstract.

*Primary Examiner*—Curtis Mayes
*Attorney, Agent, or Firm*—Sughrue, Mion, Zinn Macpeak & Seas, PLLC

[57] ABSTRACT

A method for producing optical disks each by bonding two disk substrates to each other through an adhesive sheet, which comprises the steps of: preparing a tape which includes a release tape, and a plurality of disk-like adhesive sheets arranged under a lower surface of the release tape at predetermined intervals; pressing the tape against an upper surface of a first disk substrate by an elastic material to thereby temporarily bond the first disk substrate to one of the adhesive sheets under the lower surface of the tape so as to form a temporarily bonded article; separating the release tape from the temporarily bonded article to expose the adhesive sheet; putting a second disk substrate on the exposed adhesive sheet and pressing the second disk substrate against the exposed adhesive sheet by the elastic material to thereby stick the second disk substrate to the temporarily bonded article so as to form a stuck article; and keeping the stuck article under a pressure or heat and pressure atmosphere to thereby bond the first and second disk substrates.

8 Claims, 7 Drawing Sheets

METHOD OF PRODUCING OPTICAL DISKS AND APPARATUS USED THEREFOR

BACKGROUND OF THE INVENTION

1. Field of the Invention

The present invention relates to a method of producing optical disks each by bonding two disk substrates to each other through an adhesive double coated sheet and apparatus used therefore.

2. Description of the Prior Art

An optical disk is formed by bonding two disk substrates having a recording layer in at least one surface to each other. The bonding of the disk substrates as described above is made by sandwiching an adhesive agent between the two disk substrates and pressing the two disk substrates against each other, as disclosed in, for example, Japanese Patent Publication No. Sho. 61-80534.

According to the bonding method using such an adhesive agent, there is, however, required a troublesome operation of applying the adhesive agent onto the disk substrates. Furthermore, it is difficult to apply the adhesive agent evenly, so that the degree of parallelism in the stuck disk substrates may become poor or air may be mixed in the adhesive agent so that air bubbles may be generated in a joint portion. Accordingly, there was also a problem in terms of quality. Further, when the disk substrates are pressurized, the adhesive agent is forced out from the peripheral portion of the disk substrates so that burrs are produced. Accordingly, the method was not preferred also from the point of view of producing efficiency, operating efficiency, etc. because of the necessity of deburring, or the like.

Therefore, an optical disk producing apparatus described in Japanese Patent Publication No. Hei. 3-230338 has been proposed as an apparatus for bonding two disk substrates without use of any adhesive agent. As shown in FIG. 16, this apparatus comprises a disk substrate supply device 41, an adhesive double coated sheet supply device 42, a bonding jig 43, a jig opening/closing device 44, a conveyor 47 for conveying and inverting the disk substrates 46, a vacuum presser 48, a jig moving device 52, a release film gripping mechanism 49, and a finished article storage place 50. The two disk substrates 46 are bonded through an adhesive double coated sheet 51 by means of vacuum pressing. That is, the two disk substrates 46 are bonded to each other by the steps of: first, bonding the first disk substrate 46 to the adhesive double coated sheet 51 by means of vacuum pressing; then separating a release film 53 by the release film gripping mechanism 49 and inverting the first disk substrate; and then bonding the second disk substrate 46, by means of vacuum pressing, to the first disk substrate 46 with the adhesive double coated sheet 51 stuck thereto.

In the aforementioned apparatus, vacuum pressing, however, must be required twice for bonding two disk substrates 46 to each other to obtain one optical disk. Furthermore, because a large time is required for evacuation whenever the vacuum pressing is made, producing efficiency is very poor. As a result, there arises a problem that the cost increases. Further, because this apparatus requires a vacuum pump used for vacuum pressing and the frequency of use of the vacuum pump is high, maintenance, or the like, for the vacuum pump is required so that the cost increases more intensively. There is a further problem that the optical disk bonded by means of vacuum pressing is large in distortion and warp and low in precision.

SUMMARY OF THE INVENTION

The present invention is designed under such circumstances and has as its object the provision of an optical disk producing method which can produce high precision optical disks efficiently, and an apparatus used therefor.

To achieve the aforementioned object, according to the present invention, there is provided a method of producing an optical disk comprising the steps of: pressing an adhesive double coated sheet against one surface of a first disk substrate by an elastic material to thereby temporarily bond the first disk substrate to the adhesive double coated sheet to thereby form a temporarily bonded article; putting a second disk substrate on the adhesive double coated sheet; pressing the second disk substrate against the adhesive double coated sheet by the elastic material to thereby stick the second disk substrate to the temporarily bonded article to thereby form a stuck article; and keeping the stuck article under a pressure or heat and pressure atmosphere to thereby bond the first and second disk substrates to each other.

Further, according to the present invention, there is provided an apparatus for producing an optical disk comprising: means for supplying an adhesive double coated sheet; temporarily bonding means for pressing the adhesive double coated sheet against one surface of a first disk substrate by an elastic material so as to temporarily bond the first disk substrate to the adhesive double coated sheet to thereby form a temporarily bonded article; sticking means for putting a second disk substrate on the exposed adhesive double coated sheet and pressing the second disk substrate against the adhesive double coated sheet by the elastic material so as to stick the second disk substrate to the temporarily bonded article to thereby form a stuck article; and bonding means for keeping the stuck article under a pressure or heat and pressure atmosphere to thereby bond the first and second disk substrates.

That is, in the present invention, the tape is pressed against the upper surface of the first disk substrate by the elastic material to thereby temporarily bond the first disk substrate to one of the adhesive double coated sheets under the lower surface of the tape so as to form a temporarily bonded article; and the second disk substrate is put on the temporarily bonded article and pressed against the temporarily bonded article by the elastic material to thereby stick the second disk substrate to the temporarily bonded article so as to form a stuck article. Because temporary bonding and sticking are performed by the elastically pressing force of the elastic material as described above, not only the load on the disk substrates is reduced but also the disk substrates can be pressed evenly so that the resulting optical disk is hardly distorted or deformed. Further, because the stuck article obtained by temporary bonding and sticking is continuously kept under a pressure or heat and pressure atmosphere to thereby bond the first and second disk substrates, the conventional necessity of performing vacuum pressing twice for one optical disk is eliminated. Accordingly, producing efficiency is improved remarkably, so that the reduction in cost can be attained. In addition, this apparatus does not require maintenance, or the like, for the vacuum pump.

Further, when the pressing surface of the elastic material in the present invention is shaped like a cone or sphere, the adhesive double coated sheet and the first and second disk substrates, first, touch each other from the center portion and then pressed against each other successively toward the periphery with the deformation of the elastic material so as to be stuck to each other. Accordingly, sticking is performed while air bubbles are pressed out, so that air bubbles are hardly produced in the contact surfaces between the adhesive sheet and the two disk substrates. Further, because pressure is given gradually from the center toward the periphery, partial distortion is little given to the two disk substrates. Moreover, even in the case where the two disk substrates are more or less distorted, the distortion of each of the two disk substrates is corrected so that a stuck article little in warp is obtained.

Further, when the elastic material in the present invention has a rubber hardness of not larger than 50 degrees, the load on the two disk substrates is so small that the two disk substrates are hardly distorted or deformed.

DETAILED DESCRIPTION OF THE PREFERRED EMBODIMENTS

A mode for carrying out the present invention will be described below in detail.

Figure 1:
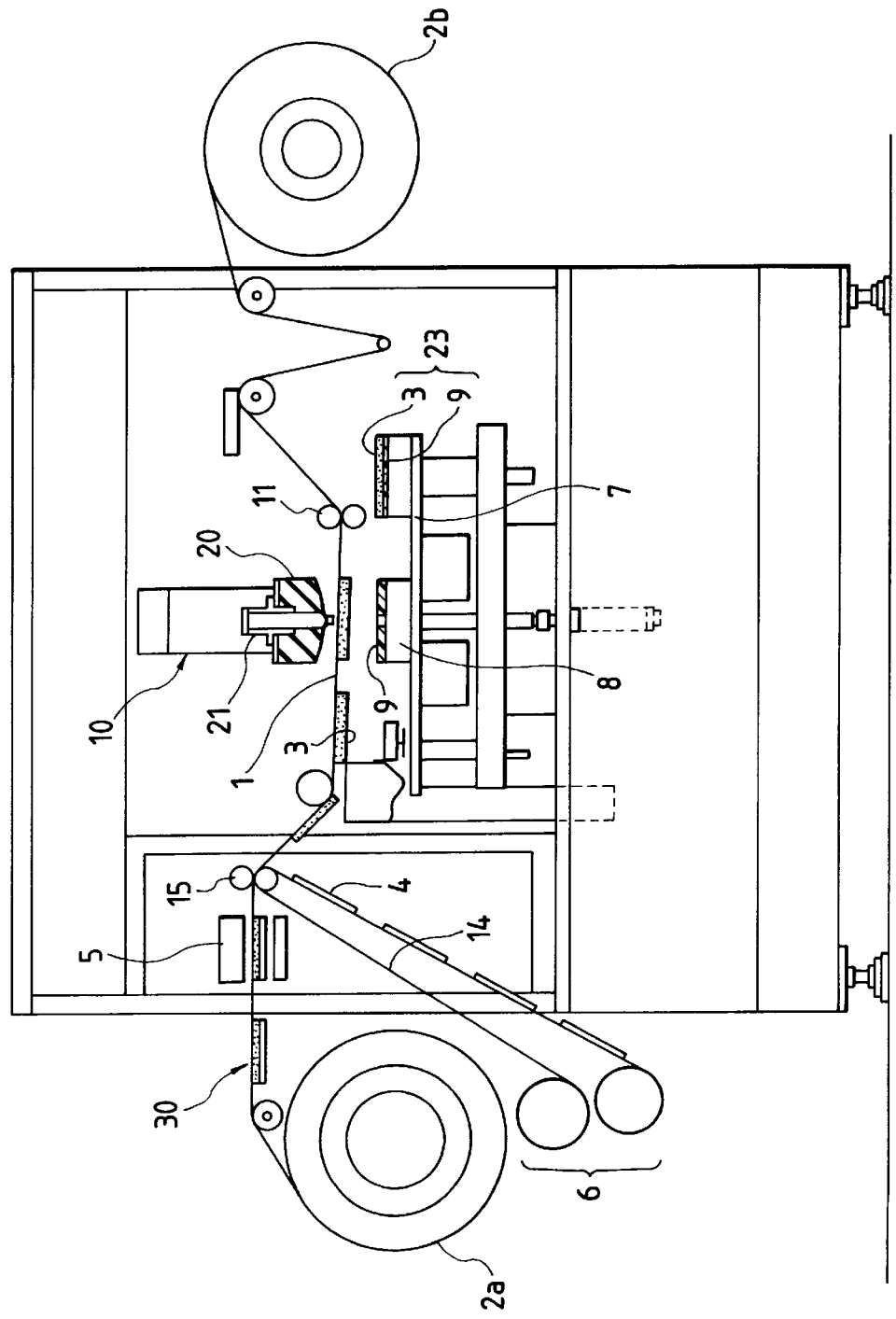
FIG. 1 is an explanatory view showing an optical disk producing apparatus according to the present invention.
Figure 2:
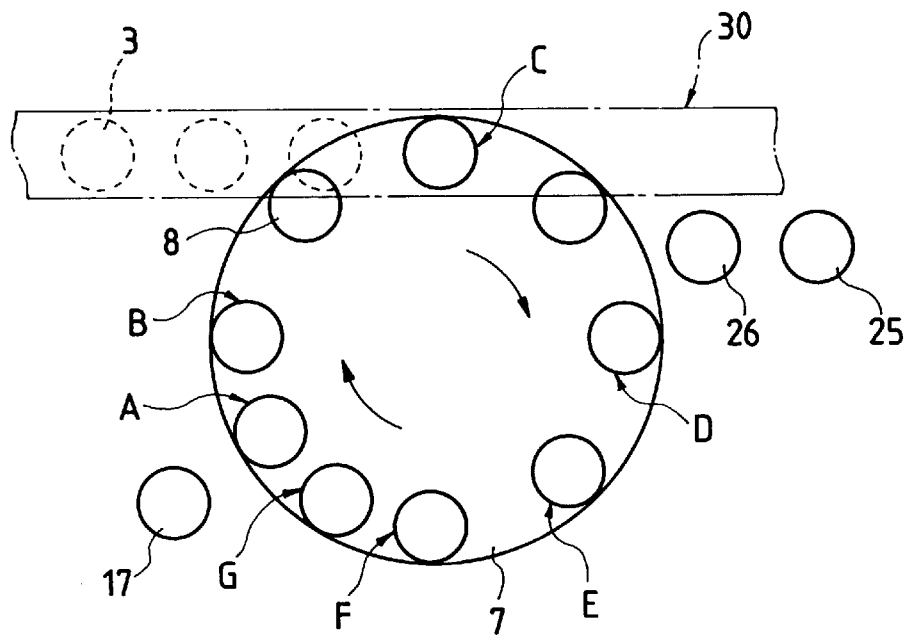
FIG. 2 is an explanatory top view showing a state of an index table.

FIG. 1 shows an embodiment of the optical disk producing apparatus according to the present invention. In the figure, the reference numeral 30 designates a tape which contains disk-like adhesive double coated sheets (hereinafter referred to as "adhesive sheets") 3 arranged in line at predetermined intervals under the lower surface of a release tape 1. In the present embodiment, the adhesive double coated sheet 3 is a pressure-sensitive adhesive double coated sheet. The tape 30 is fed from a supply roll 2a and taken up by a takeup roll 2b in the front side (right in the drawing). The reference numeral 7 designates an index table which is shaped like a disk and on which stages 8 are provided circumferentially as shown in FIG. 2. First disk substrates 9 are put on these stages 8 respectively, so that sticking of the first disk substrates 9 to the adhesive sheets 3, or the like, is performed. The reference numeral 10 designates a sticking device for sticking and temporarily bonding the first disk substrates 9 to the adhesive sheets 3. The reference numeral 11 designates a separating roll for separating the release tape 1 from the temporarily bonded article 23.

Figure 3:
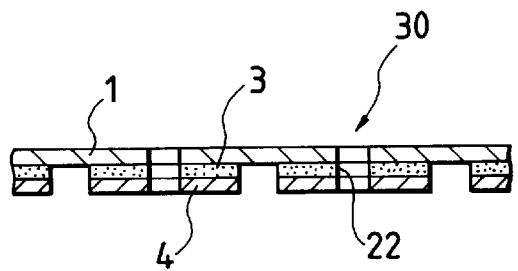
FIG. 3 is a sectional view showing a tape.
Figure 4:
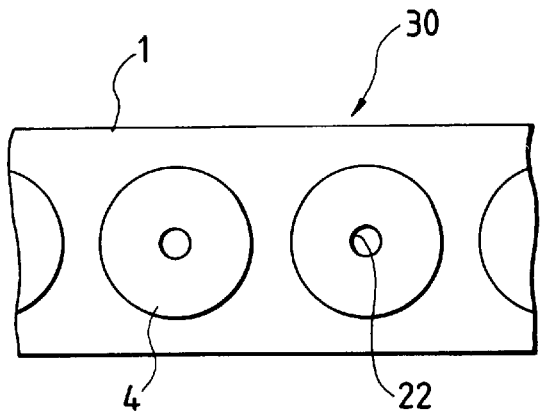
FIG. 4 is a bottom view of the tape.

More in detail, the aforementioned tape 30 has the adhesive double coated sheets 3 arranged in line at predetermined intervals under the lower surface of the release tape 1, and lower release tapes 4 stuck to the lower surfaces of the adhesive sheets 3 respectively as shown in FIGS. 3 and 4. Further, center holes 22 corresponding to the center holes of the first disk substrates 9 are formed in the centers of the adhesive sheets 3 of the tape 30.

A tension controller and a zigzag control guide (both not shown) are provided in the supply portion of the tape 30. As each of rolls provided on the way of feeding of the tape 30, a roll having a groove or guide with the same width as that of the tape 30 is used so that the tape 30 is fed straight from the supply roll 2a to the takeup roll 2a.

Figure 5:
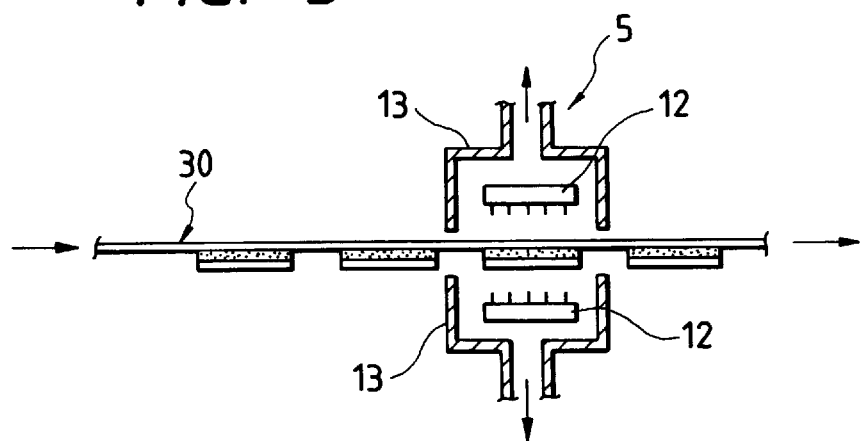
FIG. 5 is an explanatory view showing a tape cleaning device.

The tape 30 supplied from the supply roll 2a (referring back to FIG. 1), first, passes through the tape cleaning device 5 so as to be cleaned. As shown in FIG. 5, the tape cleaning device 5 is configured so that suckers 13 each having a static eliminator 12 in its inside are disposed above and blow the tape 30. The static electricity, or the like, on the tape 30 is removed by the static eliminator 12, and stain such as fine dust, or the like, is sucked and removed by the suckers 13.

Figure 6:
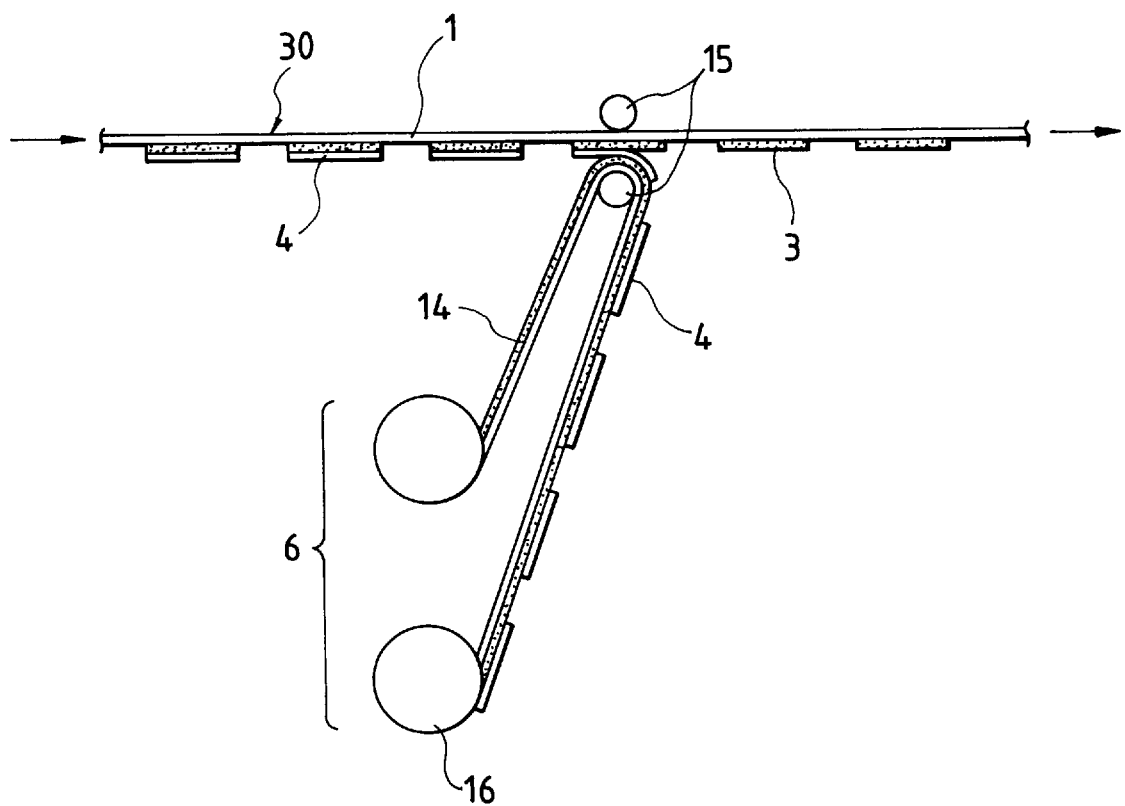
FIG. 6 is an explanatory view showing a separating device.

Then, the lower release tapes 4 contained in the tape 30 (referring to FIG. 1) are separated by the separating device 6. As shown in FIG. 6, in the separating device 6, the tape 30 together with a removal tape 14 is sandwiched between a pair of nip rolls 15 so that the lower release tapes 4 are bonded to the removal tape 14. Further, when the removal tape 14 is taken up by a lower takeup roll 16, the lower release tapes 4 are separated so that the adhesive sheets 3 are exposed downward. Further, as shown in FIG. 7, the tape 30 having the adhesive sheets 3 exposed downward is designed so as to be fed into between each of the first disk substrates 9 put on the index table 7 and the sticking device 10 standing by above the first disk substrate 9.

Figure 8:
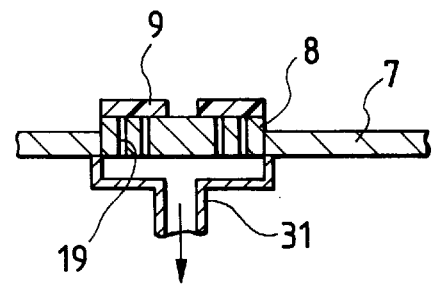
FIG. 8 is an explanatory view showing a state in which a first disk substrate is put on the index table.

On the other hand, each of the first disk substrates 9 is supplied onto the index table 7. That is, (referring to FIG. 2,) the first disk substrates 9 are put on the stages 8 (position A shown in FIG. 2), respectively, of the index table 7 by a transfer robot (not shown) from the disk storage place 17 provided in the front of the index table 7. As shown in FIG. 8, air is sucked by a sucker 31 from a suction hole 19 provided in each of the stages 8 so that the first disk substrate 9 put on the stages 8 is absorbed and fixed. Then, the index table 7 rotates right by about 30 degrees (position B shown in FIG. 2) so that the first disk substrate 9 is cleaned.

Figure 9:
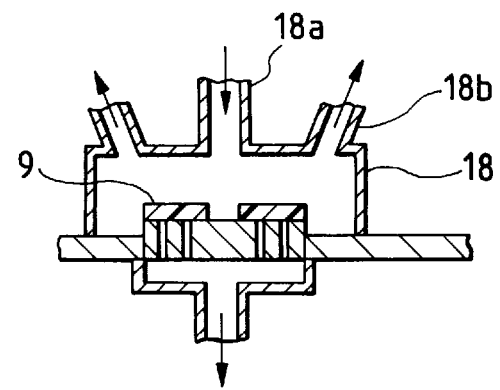
FIG. 9 is an explanatory view showing a disk cleaning device.

As shown in FIG. 9, the cleaning in the second position B is designed so that the first disk substrate 9 is covered with a cleaning cover 18 and static-eliminating air is blown in from a blow-in port 18a and sucked from suction ports 18b so that static electricity of fine dust, or the like, deposited on the surface of the first disk substrate 9 is neutralized so as to be removed easily. Thus, the dust, or the like, is removed.

Figure 7:
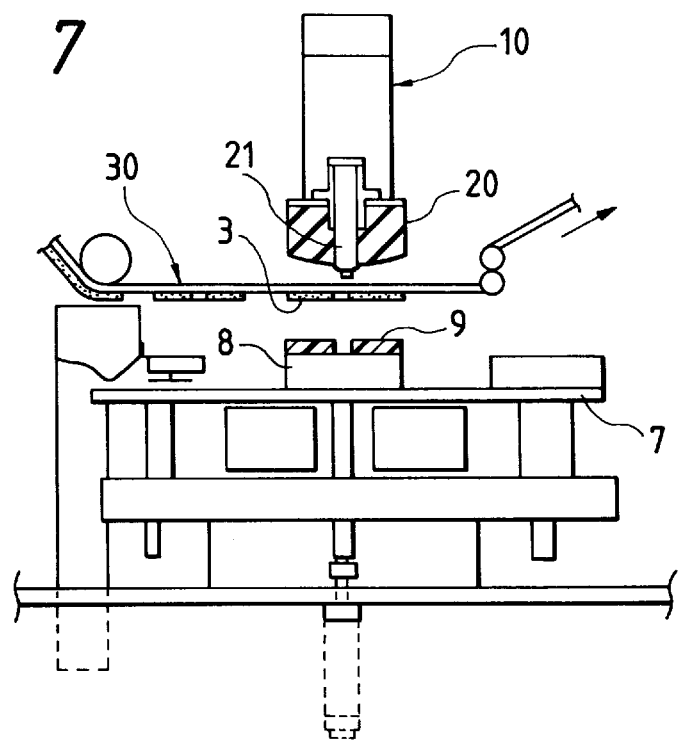
FIG. 7 is an explanatory view showing a standby state of temporary bonding.

When the first disk substrate 9 is cleaned, the index table 7 rotates further by 90 degrees (position C shown in FIG. 2) so that the first disk substrate 9 is positioned to the lower side of the adhesive sheet 3 exposed in the lower surface of the supplied tape 30 (see FIG. 7). Then, the lower surface of the adhesive sheet 3 contained in the tape 30 and the upper surface of the first disk substrate 9 are stuck to each other to thereby form a temporarily bonded article 23.

The sticking device 10 has an elastic material 20 having a lower surface (pressing surface) shaped substantially like a cone so that the elastic material 20 can ascend and descend. A positioning core rod 21 is disposed in the center of the elastic material 20 so as to be inserted into the center hole 22 of the adhesive sheet 3 and the center hole 24 of the first disk substrate 9 to thereby perform positioning. The elastic material 20 is formed from rubber having a rubber hardness of not less than 5 degrees and not more than 50 degrees according to JIS K 6301.

Figure 10:
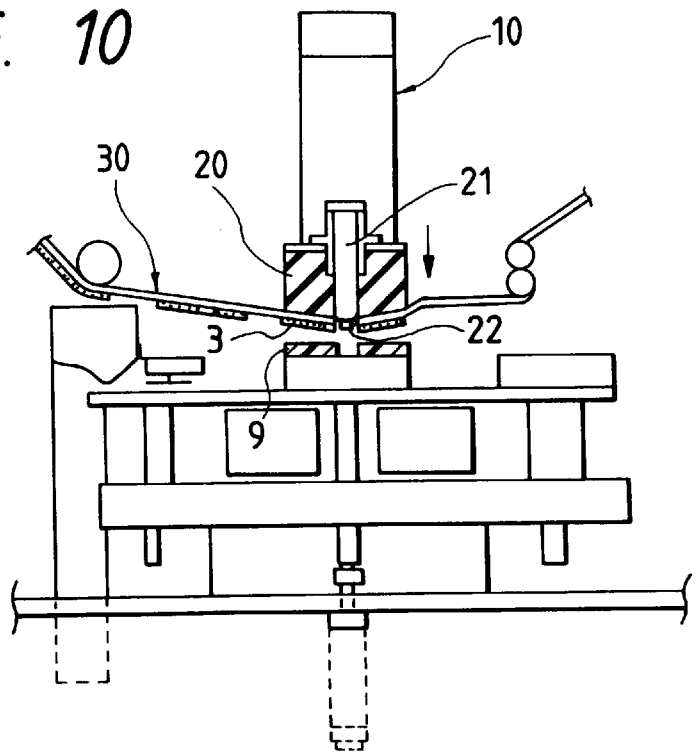
FIG. 10 is an explanatory view showing an operation of temporary bonding.

The sticking of the first disk substrate 9 to the adhesive sheet 3 is made as follows. That is, as shown in FIG. 10, the elastic material 20 descends so that the core rod 21 is inserted into the center hole 22 of the adhesive sheet 3 formed in the tape 30. As a result, not only the adhesive sheet 3 and the elastic material 20 are aligned but also the sheet 30 is stretched so that the portion of the adhesive sheet 3 is arranged along the lower surface of the conical elastic material 20.

Figure 11:
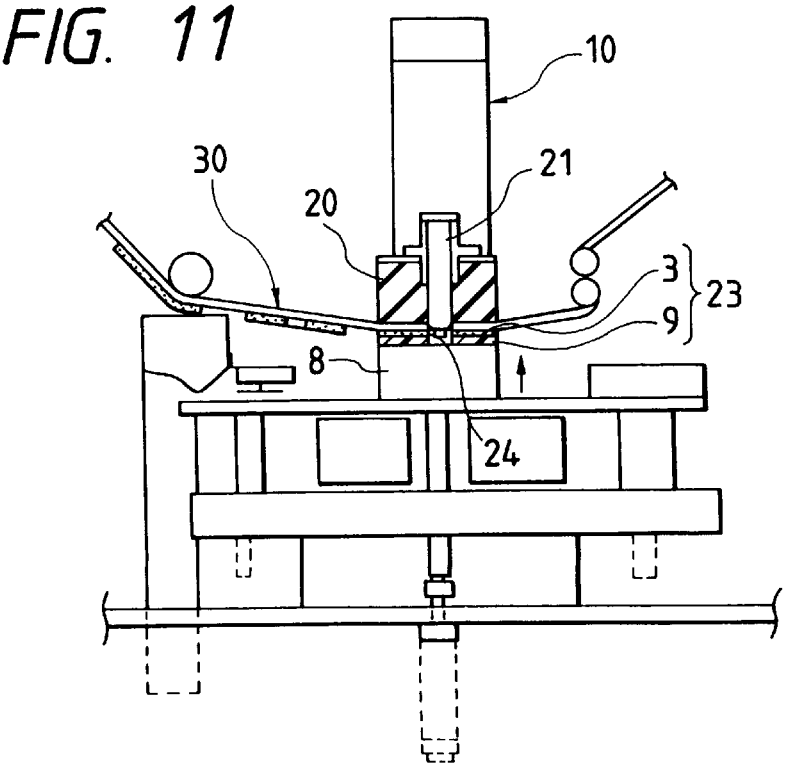
FIG. 11 is an explanatory view showing an operation of temporary bonding.

Then, as shown in FIG. 11, the stage 8 on which the first disk substrate 9 is put is pressed up, so that the tape 30 is pressed against the upper surface of the first disk substrate 9 by the elastic force of the elastic material 20. As a result, the lower surface of the adhesive sheet 3 and the upper surface of the first disk substrate 9 are stuck to each other to thereby form a temporarily bonded article 23. In this occasion, the core rod 21 is inserted into the center hole 24 of the first disk substrate 9 so that the adhesive sheet 3 and the first disk substrate 9 are aligned. Further, because the lower surface of the elastic material 20 is shaped like a cone, the adhesive sheet 3 and the first disk substrate 9, first, touch each other from the center portion so as to be stuck to each other successively toward the periphery with the deformation of the elastic material 20. Because sticking is performed while air bubbles are pressed out, air bubbles are hardly produced in the contact surface between the pressure adhesive sheet 3 and the first disk substrate 9. Further, since pressure is given gradually from the center to the periphery, the distortion given to the first disk substrate 9 is little.

Figure 12:
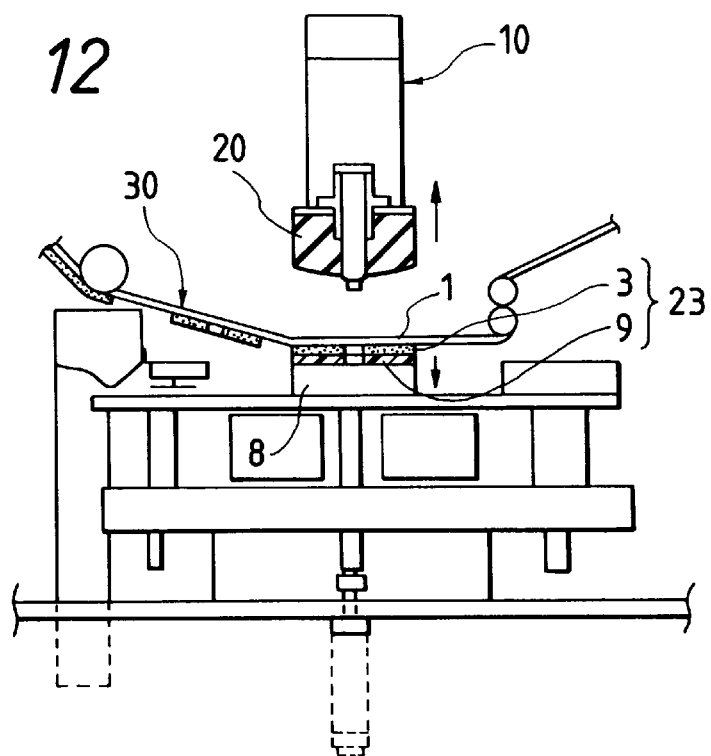
FIG. 12 is an explanatory view showing an operation of temporary bonding.
Figure 13:
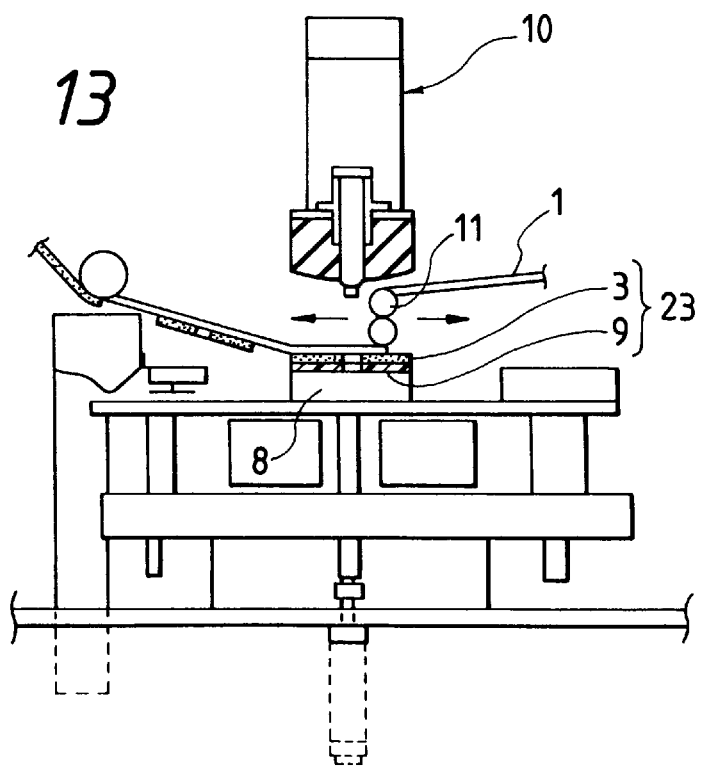
FIG. 13 is an explanatory view showing a state in which a release tape is separated from a temporarily bonded article.

Then, as shown in FIG. 12, the elastic material 20 ascends and the stage 8 descends. In this occasion, the release tape 1 descends with the descending of the temporarily bonded article 23 while the release tape 1 is kept in close contact with the adhesive sheet 3. Then, as shown in FIG. 13, the separation roll 11 moves left and right to thereby separate the release tape 1 from the upper surface of the temporarily bonded article 23. As a result, the temporarily bonded article 23 having the adhesive sheet 3 exposed upward is put on the stage 8. The release tape 1 thus separated is taken up by the takeup roll 2b.

Then, the index table 7 rotates further by about 90 degrees (position D shown in FIG. 2), so that the second disk substrate is put on the upper surface of the temporarily bonded article 23.

The second disk substrate is put on the upper surface of the temporarily bonded article 23 after the second disk substrate is transferred from the disk storage place 25 provided in the rear of the index table 7 into the disk cleaning device 26 by the transfer robot (not shown) and cleaned.

Figure 14:
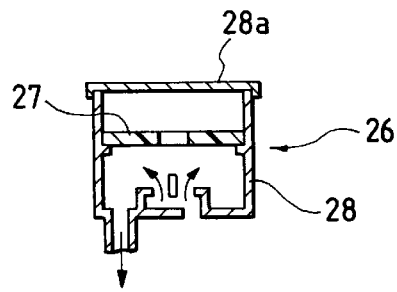
FIG. 14 is an explanatory view showing a disk cleaning device.

As shown in FIG. 14, the disk cleaning device 26 is designed so that fine dust, or the like, deposited on the surface of the second disk substrate 27 is removed when the second disk substrate 27 is put in a housing 28 and covered with a cover 28a and static-eliminating air is blown in from the bottom portion of the housing 28 and sucked.

Figure 15:
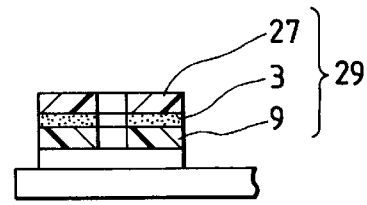
FIG. 15 is an explanatory view showing a stuck article.
Figure 16:
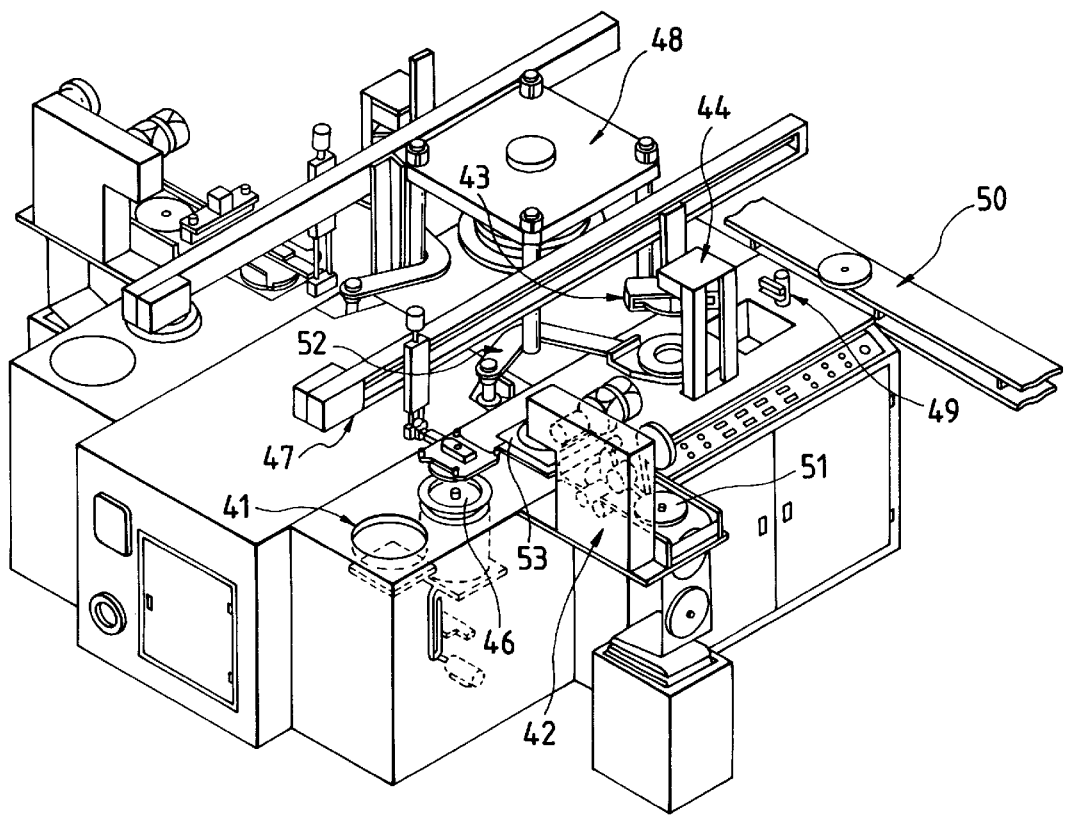
FIG. 16 is a perspective view showing a conventional optical disk producing apparatus.

When the second disk substrate 27 is put on the temporarily bonded article 23, the index table 7 rotates further by about 45 degrees (position E shown in FIG. 2). The temporarily bonded article 23 and the second disk substrate 27 are stuck to each other (see FIGS. 10 through 13) by the sticking device 10 (which is the same as shown in FIG. 7) having the elastic material 20 with a lower surface shaped like a cone, in the same manner as the sticking of the first disk substrate 9 and the adhesive sheet 3. Thus, a stuck article 29 as shown in FIG. 15 is obtained. In this occasion, because the lower surface of the elastic material 20 is shaped like a cone, the adhesive sheet 3 and the second disk substrate 27, first, touch each other partially from the center portion and then stuck to each other successively toward the periphery with the deformation of the elastic material 20. Because sticking is performed while air bubbles are pressed out as described above, air bubbles are hardly produced in the contact surface between the adhesive sheet 3 and the second disk substrate 27. Further, pressure is given gradually from the center toward the periphery, distortion is hardly given to the second disk substrate 27. Moreover, even in the case where the first disk substrate 9 and the second disk substrate 27 are more or less distorted, the distortion of each of the substrates is corrected so that a stuck article 29 little in warp is obtained.

Then, the index table 7 rotates further by about 45 degrees (position F shown in FIG. 2) and the stuck article 29 is kept for a predetermined time (for example, 1 minute) under a pressure (for example, 10 kg/cm$^2$×room temperature) or heat and pressure (for example, 6 kg/cm$^2$×60° C.) atmosphere to thereby perform air bubble removal and bonding. The bonding is carried out by a device such as an autoclave. Because the stuck article 29 is bonded while being kept under the pressure or heat-pressure atmosphere as described above, the whole of the stuck article 29 is pressurized vertically evenly. Accordingly, the degree of parallelism in the optical disk becomes good. Further, even in the case where air enters into the joint portion of the stuck article 29, the air is removed by the even pressure so that there is no air bubble produced in the joint portion.

When the bonding is completed, the index table 7 rotates further by about 30 degrees (position G shown in FIG. 2). The finished article is transferred to a product storage place by a transfer robot (not shown). The production of optical disks is carried out by the aforementioned series of operations.

Although the above embodiment has been described about the case where rubber is used as a material for the elastic material 20, there is no limitation specially. For example, various kinds of materials such as urethane, sponge, silicone rubber, SBR (styrene-butadiene rubber), chloroprene rubber, acrylic rubber, fluororubber, etc. may be used. Although a material having a rubber hardness in a range of from 5 degrees to 50 degrees, inclusively, is used as the elastic material 20, it is more effective if the rubber hardness is in a range of from 10 degrees to 40 degrees, inclusively. Although the lower surface (pressing surface) of the elastic material 20 is shaped like a cone, it is not limited thereto but may be shaped like a sphere.

In the present invention, temporary bonding and sticking are performed by the elastically pressing force of the elastic material as described above, so that not only the load on the disk substrates is reduced but also the disk substrates can be pressed evenly. Accordingly, the resulting optical disk is hardly distorted or deformed. Further, because the stuck article obtained by temporary bonding and sticking is continuously kept under a pressure or heat and pressure atmosphere to thereby bond the first and second disk substrates, the conventional necessity of performing vacuum pressing twice for one optical disk is eliminated. Accordingly, producing efficiency is improved remarkably, so that the reduction in cost can be attained. In addition, this apparatus does not require maintenance, or the like, or the vacuum pump.

Further, when the pressing surface of the elastic material in the present invention is shaped like a cone or sphere, the adhesive double coated sheet and the first and second disk substrates, first, touch each other from the center portion and then pressed against each other successively toward the periphery with the deformation of the elastic material so as to be stuck to each other. Accordingly, sticking is performed while air bubbles are pressed out, so that air bubbles are hardly produced in the contact surfaces between the adhesive sheet and the two disk substrates. Further, because pressure is given gradually from the center toward the periphery, partial distortion is little given to the two disk substrates. Moreover, even in the case where the two disk substrates are more or less distorted, the distortion of each of the two disk substrates is corrected so that a stuck article little in warp is obtained.

Further, when the elastic material in the present invention has a rubber hardness of not larger than 50 degrees, the load on the two disk substrates is so small that the two disk substrates are hardly distorted or deformed.

The foregoing detailed description of the preferred embodiment of the invention has been provided for the purposes of illustration and description. It is not intended to be exhaustive or to limit the invention to the precise embodiment disclosed. Obviously, many modifications and variations will be apparent to practitioners skilled in the art.

What is claimed is:

1. A method of producing an optical disk comprising the steps of:

elastically pressing an adhesive double coated sheet against one surface of a first disk substrate to thereby temporarily bond said first disk substrate to said adhesive double coated sheet to thereby form a temporarily bonded article;

putting a second disk substrate on said adhesive double coated sheet;

elastically pressing said second disk substrate against said adhesive double coated sheet to thereby stick said second disk substrate to said temporarily bonded article to thereby form a stuck article; and keeping said stuck article under a pressure or heat and pressure atmosphere to thereby bond said first and second disk substrates to each other, wherein said pressing steps press from a center portion of said double coated sheet successively toward a periphery thereof.

2. The method of producing an optical disk according to claim 1, further comprising the steps of:

preparing a tape which includes a release tape and a plurality of said adhesive double coated sheets arranged under a lower surface of said release tape at predetermined intervals;

pressing said tape together with said adhesive double coated sheet at the pressing step of said adhesive double coated sheet; and separating said release tape from said temporarily bonded article to expose said adhesive double coated sheet after forming said temporarily bonded article.

3. The method of producing an optical disk according to claim 1, wherein said pressing steps include pressing with pressing member respectively, made of elastic material that has a pressing surface shaped like a cone or sphere.

4. The method of producing an optical disk according to claim 3, wherein said elastic material has a rubber hardness of not less than 5 degrees and not more than 50 degrees.

5. An apparatus for producing an optical disk comprising:

means for supplying an adhesive double coated sheet;

a first presser for pressing said adhesive double coated sheet against one surface of a first disk substrate by a first elastic material so as to temporarily bond said first disk substrate to said adhesive double coated sheet to thereby form a temporarily bonded article;

a second presser for putting a second disk substrate on said exposed adhesive double coated sheet and pressing said second disk substrate against said adhesive double coated sheet by a second elastic material so as to stick said second disk substrate to said temporarily bonded article to thereby form a stuck article; and a bonder for keeping said stuck article under a pressure atmosphere to thereby completely bond said first and second disk substrates, wherein said first and second pressers press from a center portion of said double coated sheet successively toward a periphery thereof.

6. The apparatus for producing an optical disk according to claim 5, further comprising:

a tape supply means for supplying a tape which includes a release tape and a plurality of said adhesive double coated sheets arranged under a lower surface of said release tape at predetermined intervals; and a separation means for separating said release tape from said temporarily bonded article to expose said adhesive double coated sheet.

7. The apparatus for producing an optical disk according to claim 5, wherein each of said elastic materials has a pressing surface shaped like a cone or sphere.

8. The apparatus for producing optical disks according to claim 5, wherein each of said elastic materials has a rubber hardness of not less than 5 degrees and not more than 50 degrees.

* * * * *